United States Patent
Caldini et al.

(10) Patent No.: US 7,283,831 B2
(45) Date of Patent: Oct. 16, 2007

(54) SINGLE SIGN-ON SERVICE FOR COMMUNICATION NETWORK MESSAGING

(75) Inventors: Andrea Caldini, Westfield, NJ (US); Nina Cugini, Medford, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 120 days.

(21) Appl. No.: 10/625,927

(22) Filed: Jul. 24, 2003

(65) Prior Publication Data
US 2005/0021638 A1    Jan. 27, 2005

(51) Int. Cl.
*H04Q 7/20*    (2006.01)
(52) U.S. Cl. .................. 455/466; 455/418; 455/412.1; 709/227; 709/203; 379/88.22; 379/88.25
(58) Field of Classification Search ................ 709/206, 709/220, 221, 204, 229, 227, 203; 379/88.13, 379/88.22, 88.23, 88.25, 355.04; 726/8, 726/3, 4, 5; 455/466, 418, 412.1
See application file for complete search history.

(56) References Cited

U.S. PATENT DOCUMENTS

| | | | |
|---|---|---|---|
| 6,178,511 B1 * | 1/2001 | Cohen et al. ............... | 713/201 |
| 6,243,816 B1 * | 6/2001 | Fang et al. ................. | 713/202 |
| 6,571,245 B2 * | 5/2003 | Huang et al. ............... | 707/10 |
| 6,629,246 B1 * | 9/2003 | Gadi ........................... | 726/8 |
| 6,691,151 B1 * | 2/2004 | Cheyer et al. .............. | 709/202 |
| 6,721,398 B1 * | 4/2004 | Pitcher ...................... | 379/88.13 |
| 7,093,020 B1 * | 8/2006 | McCarty et al. ............ | 709/229 |
| 2002/0184507 A1 * | 12/2002 | Makower et al. ........... | 713/182 |
| 2004/0030705 A1 * | 2/2004 | Bowman-Amuah ......... | 707/100 |
| 2004/0098595 A1 * | 5/2004 | Aupperle et al. ........... | 713/185 |
| 2004/0230831 A1 * | 11/2004 | Spelman et al. ............ | 713/201 |
| 2005/0022006 A1 * | 1/2005 | Bass et al. .................. | 713/201 |

\* cited by examiner

*Primary Examiner*—Danh Le (57) ABSTRACT

The present Single Sign-On Service for Communication Network Messaging provides a wireless subscriber with the ability to login with a single service provider and then move seamlessly among the allowed messaging services to share personal address book and calendaring applications. The subscriber logs into the network from either the wireless station set interface or from the WEB user interface using a laptop or personal computer to access an AnyPath Web server. Once the subscriber has signed on to the AnyPath Web server, the subscriber's account information is accessed in a centralized profile for messaging services (Short Message Service (SMS), unified messaging, voice-mail messaging) using a single directory server and integrated address book and calendar services.

12 Claims, 7 Drawing Sheets

SINGLE SIGN-ON SERVICE FOR COMMUNICATION NETWORK MESSAGING

FIELD OF THE INVENTION

This invention relates to communication networks and to a system that enables a subscriber to use a single sign-on process from any communication device to access multiple messaging services.

PROBLEM

It is a problem in the field of messaging communications that a subscriber must initiate a separate login process for each of the messaging services to which they subscribe. There are a number of messaging services that are available to subscribers, including, but not limited to: Short Message Service (SMS), unified messaging, voicemail messaging. Each of these services maintains a set of account information for the subscriber yet cannot share this information across applications. Therefore, the subscriber must enter login information and a password for each service that is accessed. In addition, some of these services offer address book and calendar features in disjunct fashion.

From a wireless network perspective, the service applications and subscriber databases are not standard and integrated to provide a unified subscriber access. Each service is architected using a separate, proprietary database to authenticate the subscriber, and to maintain the subscriber's address and calendar data.

Therefore, the existing state of subscriber messaging communications is that there is a proliferation of communication devices, each with its own set of messaging services. The subscriber can have a pager, cell phone, office personal computer, home personal computer, Personal Digital Assistant, office wire-line telephone, personal wire-line telephone. The subscriber receives messages via office voice mail, cell phone voice mail, home voice-mail, office e-mail, home e-mail, cell phone text messages, fax messages, etc. Each of these communication devices is equipped with a directory of contact numbers & addresses. Although presently unavailable from these existing messaging services, the subscriber would be best served by a single access point to retrieve and respond to messages, regardless of their source. The access would preferably be through a speech activated interface to thereby enable hands-free communications.

SOLUTION

The above-described problems are solved and a technical advance achieved in the field by the present Single Sign-On Service for Communication Network Messaging (termed "single sign-on system" herein) which provides a wireless subscriber with the ability to login with a single service provider and then move seamlessly among the allowed messaging services to share personal address book and calendaring applications. The subscriber logs into the network from either the wireless station set interface or from the WEB user interface using a laptop or personal computer to access an AnyPath Web server. Once the subscriber has signed on to the AnyPath Web server, the subscriber's account information is accessed in a centralized profile for messaging services (Short Message Service (SMS), unified messaging, voice-mail messaging) using a single directory server and integrated address book and calendar services.

DETAILED DESCRIPTION OF THE DRAWINGS

The existing state of subscriber messaging communications is that there is a proliferation of communication devices, each with its own set of messaging services. The subscriber can have a pager, cell phone, office personal computer, home personal computer, Personal Digital Assistant, office wire-line telephone, personal wire-line telephone. The subscriber receives messages via office voice mail, cell phone voice mail, home voice-mail, office e-mail, home e-mail, cell phone text messages, fax messages, etc. Although presently unavailable from these existing messaging services, the subscriber would be best served by a single access point to retrieve and respond to messages, regardless of their source. The access would preferably be through a speech activated interface to thereby enable hands-free communications.

Architecture of the Single Sign-On System

Figure 1:
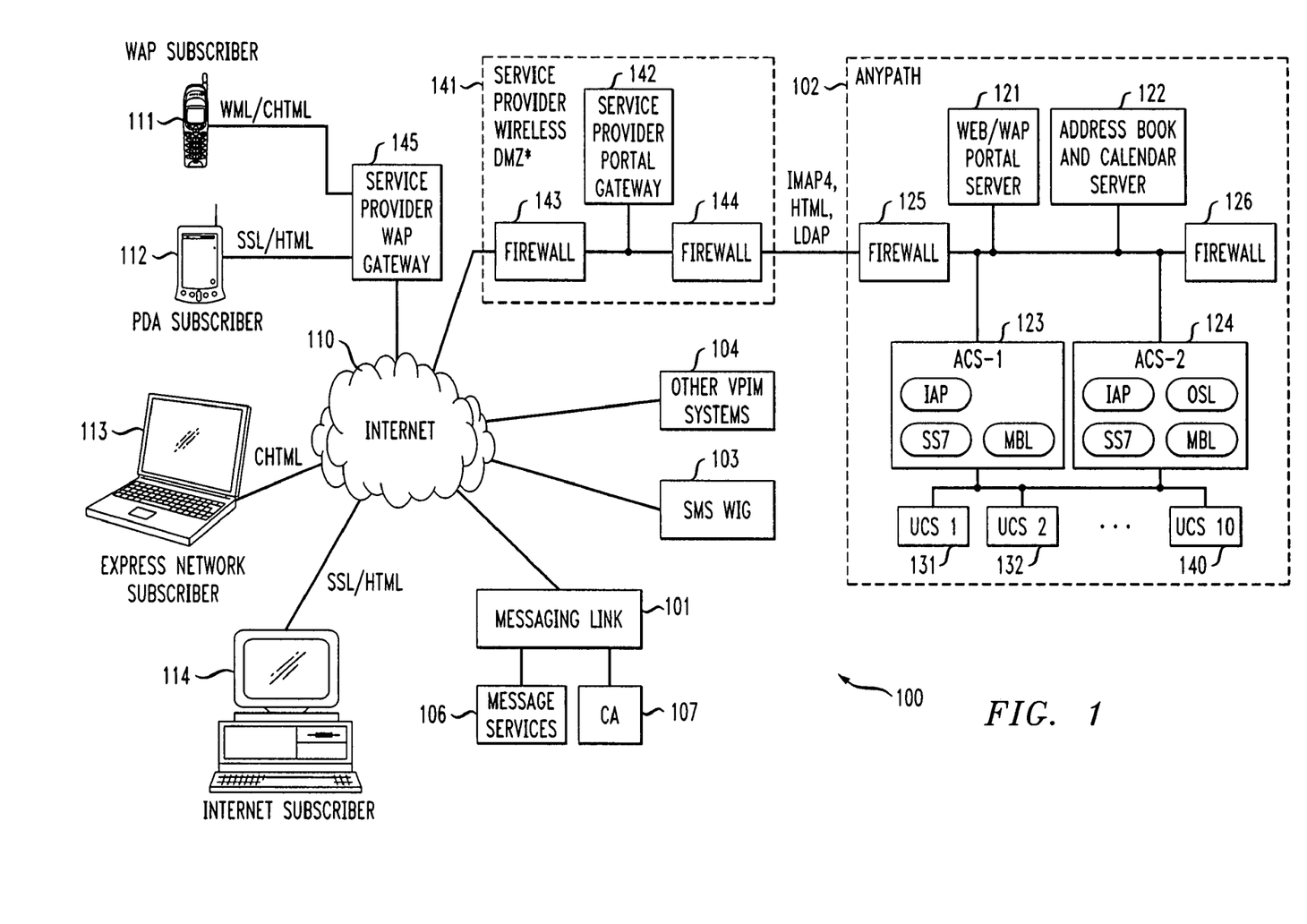
FIG. 1 illustrates the overall architecture of the present single sign-on system and a typical operating environment.
Figure 2:
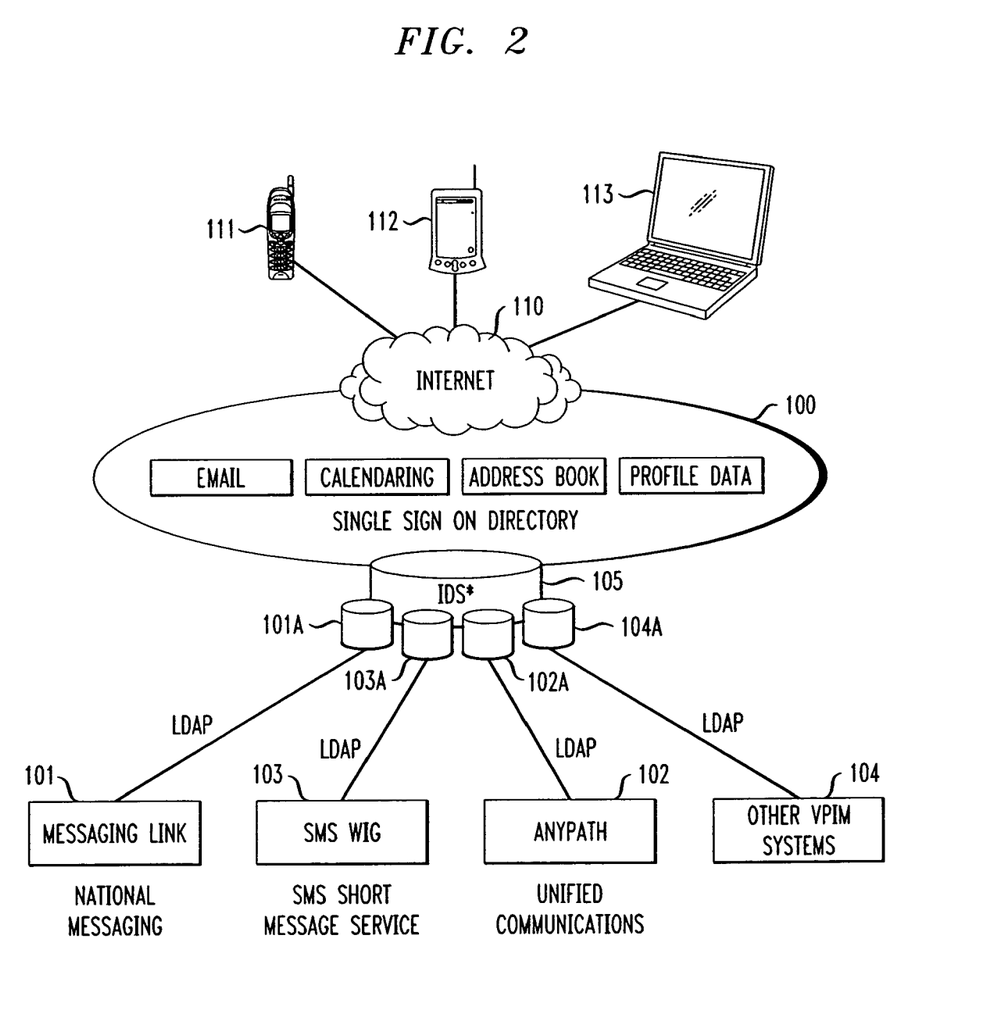
FIG. 2 illustrates the directory component of the present single sign-on system.

FIG. 1 illustrates the overall architecture of the present single sign-on system and a typical operating environment and FIG. 2 illustrates the directory component of the present single sign-on system. The subscriber, using a communications device (such as a cell phone 111, WAP handset 112, laptop computer 113, personal computer 114), can access a single sign-on system 100 which serves to integrate a plurality of different types of communication devices, each with its own set of messaging services, to an AnyPath unified messaging system 102, Messaging Link messaging gateway 101, SMS systems 103, Voice Profile for Internet Messaging systems 104, and the like. The WAP subscriber devices 111 and PDA subscriber devices 112 connect to a WAP gateway 145 to interconnect via the Internet 110 to the single sign on service 100 via the gateway system 141. Firewalls 125, 126, 143, 144 are typically used to protect the integrity of the data maintained by the single sign on system 100.

The single sign-on system 100 operates to enable a subscriber to obtain access to the plurality of messaging services via either a Telephone User Interface or a WEB User interface 121. The single sign-on system 100 provides a service that includes the integration of Lucent's AnyPath unified messaging system 102, Messaging Link 101 messaging gateway which serves a plurality of messaging services 106, and SMS systems 103 using a centralized directory server 105 using a LightWeight Database Access Protocol (LDAP) as a typical data communications standard Protocol. This integration of the unified messaging system component 122 of the single sign-on system 100 with the LightWeight Database Access Protocol directory 105 provides a wireless subscriber with the ability to login with a single service provider and then move seamlessly among the allowed messaging services to share personal address book and calendaring applications.

The single sign-on system directory 105 stores all subscriber profile data in a unified database that contains components 101A-104A that are received from the associated messaging systems 101-104. The single sign-on system directory 105 is updated by the various messaging systems 101-104 for provisioning new subscribers and updating subscriber profile data in real time. The single sign-on system directory 105 contains subscriber profile data such as mobile telephone number, spoken name, e-mail address, services access, and links to the personal address book and calendar servers. The single sign-on system directory 105 authenticates and then allows the subscriber to access messaging services that are enabled in their profile. The service operates on either the Telephone User Interface or from the WEB User interface.

Thus, the single sign-on system 100 enables a subscriber to access voice mail, e-mail and faxes from any device. This includes access to the Messaging Link messaging gateway, which provides nationwide messaging including broadcast messaging and Internet voice messaging using a centralized directory server.

AnyPath™ Messaging System

The AnyPath™ Messaging System 102 is a commercially available product distributed by Lucent Technologies and consists of a next-generation highly scaleable and reliable messaging platform that offers unified messaging (UM), unified communications (UC), and multimedia messaging services to end-users. The AnyPath™ Messaging System 102 offers an intuitive natural experience for subscribers to access and manage their messages, voice, fax, and email, from any phone 111 (fixed and wireless), Personal Computer 114, PDA 112, laptop 113, or Web browser—anywhere in the world—simply and easily.

In addition, the AnyPath™ Messaging System 102 offers media conversion through text-to-speech and text-to-fax engines, Speech-Activated Messaging and Voice-Activated Dialing for hands-free operations, and state-of-the-art portal technologies for accessing the Internet in real time. The AnyPath™ Messaging System 102 is able to integrate with an existing messaging infrastructure including legacy voice mail systems. The AnyPath™ Messaging System 102 provides call answering, simple message storage and retrieval capabilities. This includes advanced mailbox management such as group lists, notification using a variety of methods such as Message Waiting Indication (MWI), Short Message Service (SMS), Paging, etc., outbound calling such as callback, call sender rebound, cut-through paging, and message composition, forwarding and broadcast. The AnyPath™ Messaging System 102 allows users to seamlessly access, retrieve, and manage email, voice mail, and fax, from PC or telephone (wireline or wireless), irrespective of the message type using advanced features such as Text-to-speech, Text-to-fax, etc. The AnyPath™ Messaging System 102 allows consumers to use the "spoken word," to access a personalized address book for voice activated dialing and a variety of user friendly information from the World Wide Web 107. The Voice Portal provides: Voice activated dialing (for address book) and Voice service for accessing the internet (stock market quotes, weather, sports, television shows, etc.). The AnyPath™ Messaging System Web Browser aggregates content from multiple sources into a single Personal Communications Information Portal (PCIP).

AnyPath Messaging System 102 consists of the Telephony Server 121, Administration and Control Server, Message Store, Web Server 121, and Personal Address Book/Calendar directory server 122. The Telephony Server is responsible for accepting and processing the call from the central office switch via T1 trunks and supports SS7 signaling protocol for call set up. The Telephony Server also interfaces with the AnyPath Automatic Speech Recognition (ASR) servers 131, Text To Speech (TTS) servers 132, VoiceXML servers 140, which are a local shared resource for multiple telephony servers. Administration and Control Server (ACS) 123, 124 provides the Operations, Administration, Maintenance, and Provisioning interface to the AnyPath Messaging System 102, It contains the mailbox locator which identifies what message store the subscriber data is located on. The Administration and Control Server 123, 124 also includes the logic to interface and control the Personal Address Book/Calendar directory. The message store consists of multiple centralized servers that hold the user voicemail messages. The Web server provides the Web User Interface access to the AnyPath Messaging System 102 service wide directory including Personal Address Book and Calendar. Personal Address Book/Calendar Server 122 are directory servers supporting standard LightWeight Database Access Protocol (LDAP).

Messaging Link

Messaging Link 101 provides Caller Application (CA) subscribers with powerful, new capabilities, such as the ability to reply-to-telephone answering, real-time spoken name confirmation of dialed address, and intelligent message routing. Intelligent message routing can be used as the initial step to reduce the cost of implementing and maintaining the networked messaging infrastructure. When combined, these capabilities can build stronger and larger messaging communities for subscribers. For example the Reply to Telephone Answer service makes it easier for recipients of messages on a Messaging Link networked solution to respond to messages. If the sender has a voice mailbox, the recipient only needs to use a key sequence to automatically address the sender. There is no need to key in the address when responding to a message.

Caller Application

The Caller Application (CA) 107 is Lucent's legacy voicemail system. This voicemail system is used in the case when a user is sending a voice message to another voicemail system through a gateway server called MessagingLink 101. MessagingLink 101 is Lucent's Voice Profile for Internet Messaging (VPIM) standard gateway server. When a subscriber is added, deleted, or changed on the Caller Application 107 voicemail system, MessagingLink 101 automatically receives the changed user record data and then automatically updates the Service Wide Directory. MessagingLink 101 receives spoken name, extended absence greeting flag, blocked messages flag, and mailbox full flag from the Caller Application voicemail system 107.

Both AnyPath 102 and Caller Application 107 users have the ability to create a voice message and send it to a user on another voicemail system through MessagingLink 101. MessagingLink 101 supports the VPIM standard that enables proprietary systems to send/receive messages. The MessagingLink 101 uses the service wide directory (LDAP protocol) to validate the recipient of the message and identify its routing address. In addition to Personal Address Book and Calendar, the service wide directory includes subscriber data specifically for Voice Profile for Internet Messaging messaging. The directory includes the subscriber's spoken name, extended absence greeting flag, blocked messages flag, and mailbox full flag from the voicemail system.

Operation of the Single Sign-On System

Figure 3A:
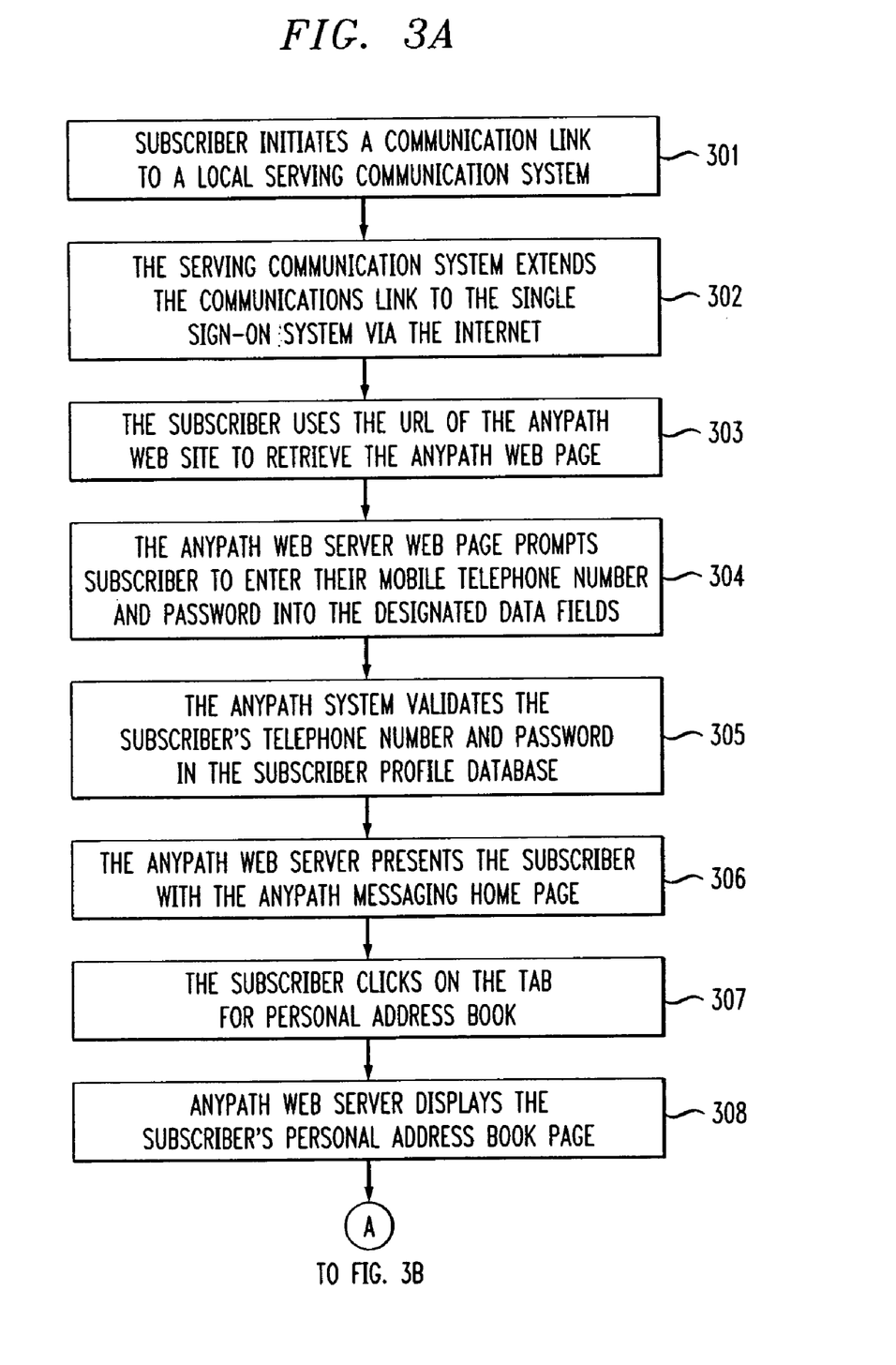
FIGS. 3A & 3B illustrate in flow diagram form the operation of the present single sign-on system.
Figure 3B:
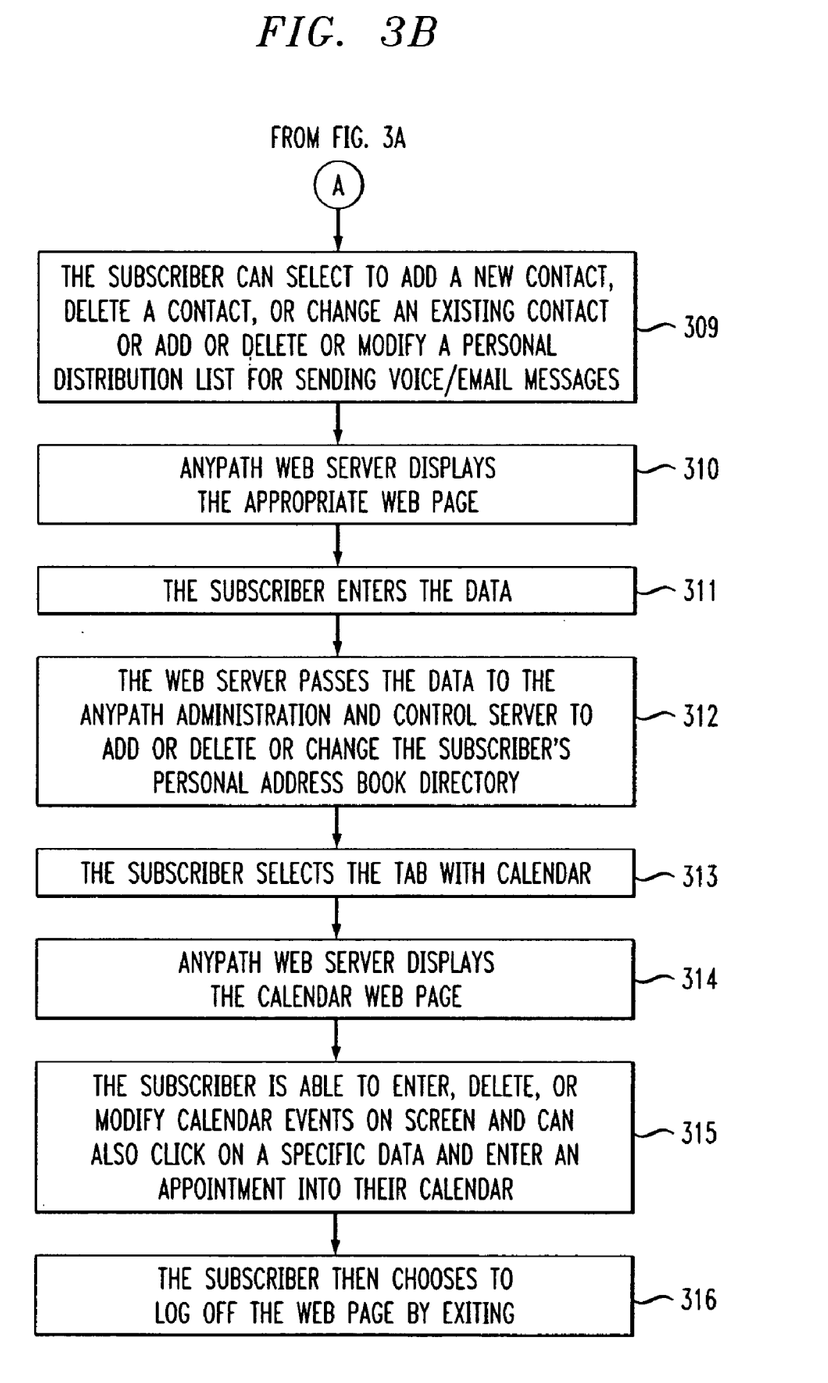
Figure 4:
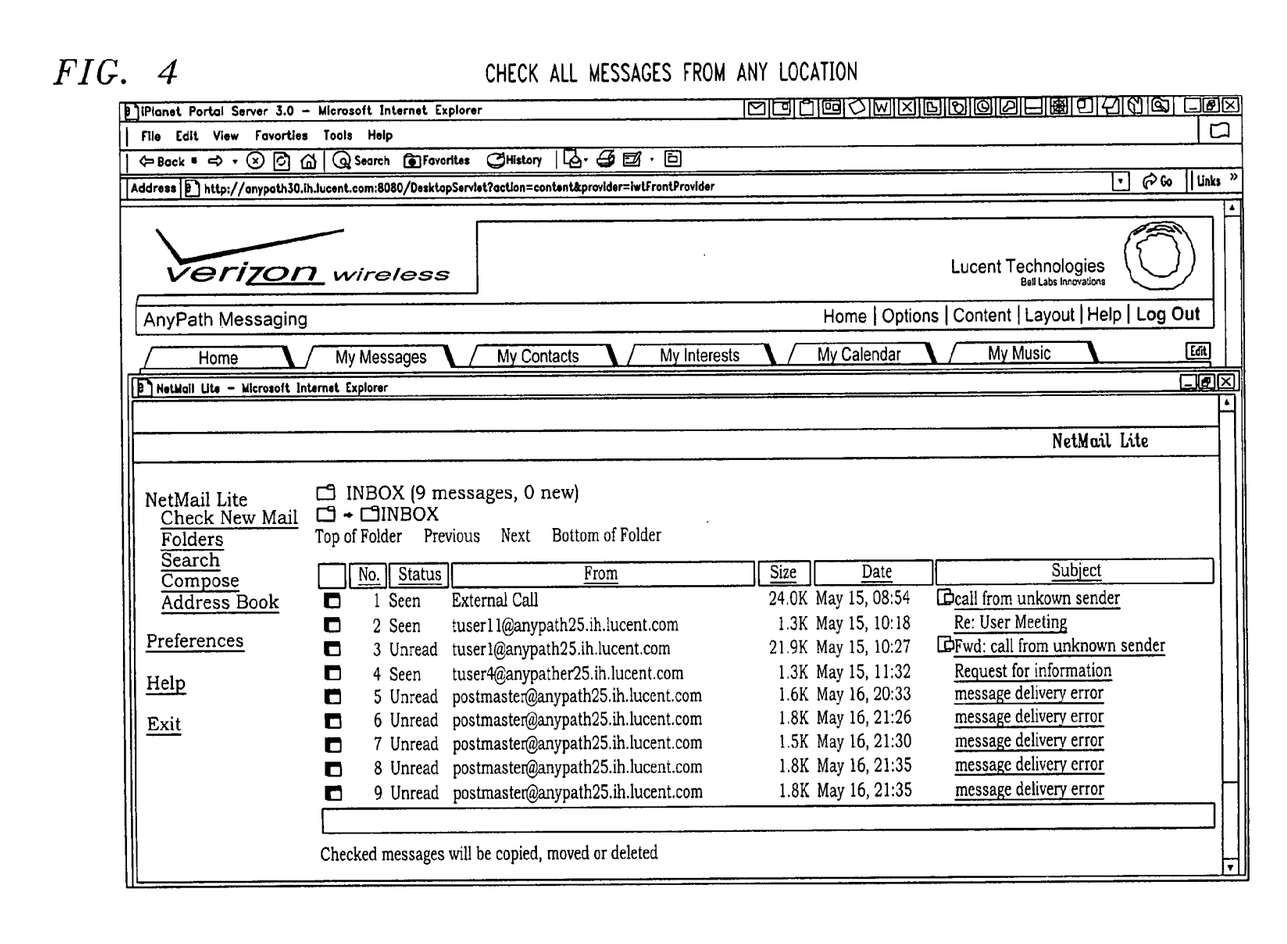
FIGS. 4-6 illustrate typical user interface displays that are presented to a subscriber by the present single sign-on system in the execution of various subscriber-selected functions.
Figure 5:
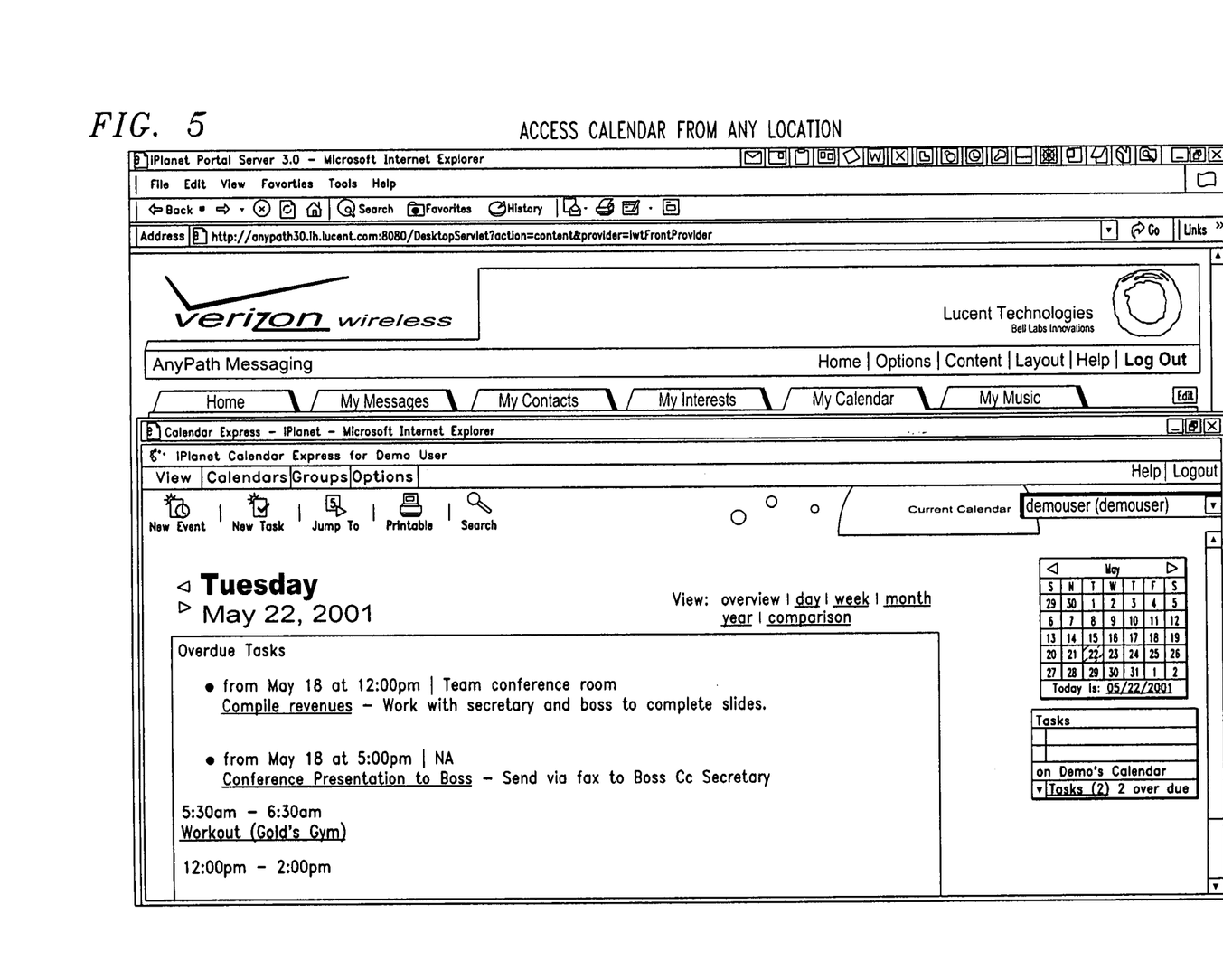
Figure 6:
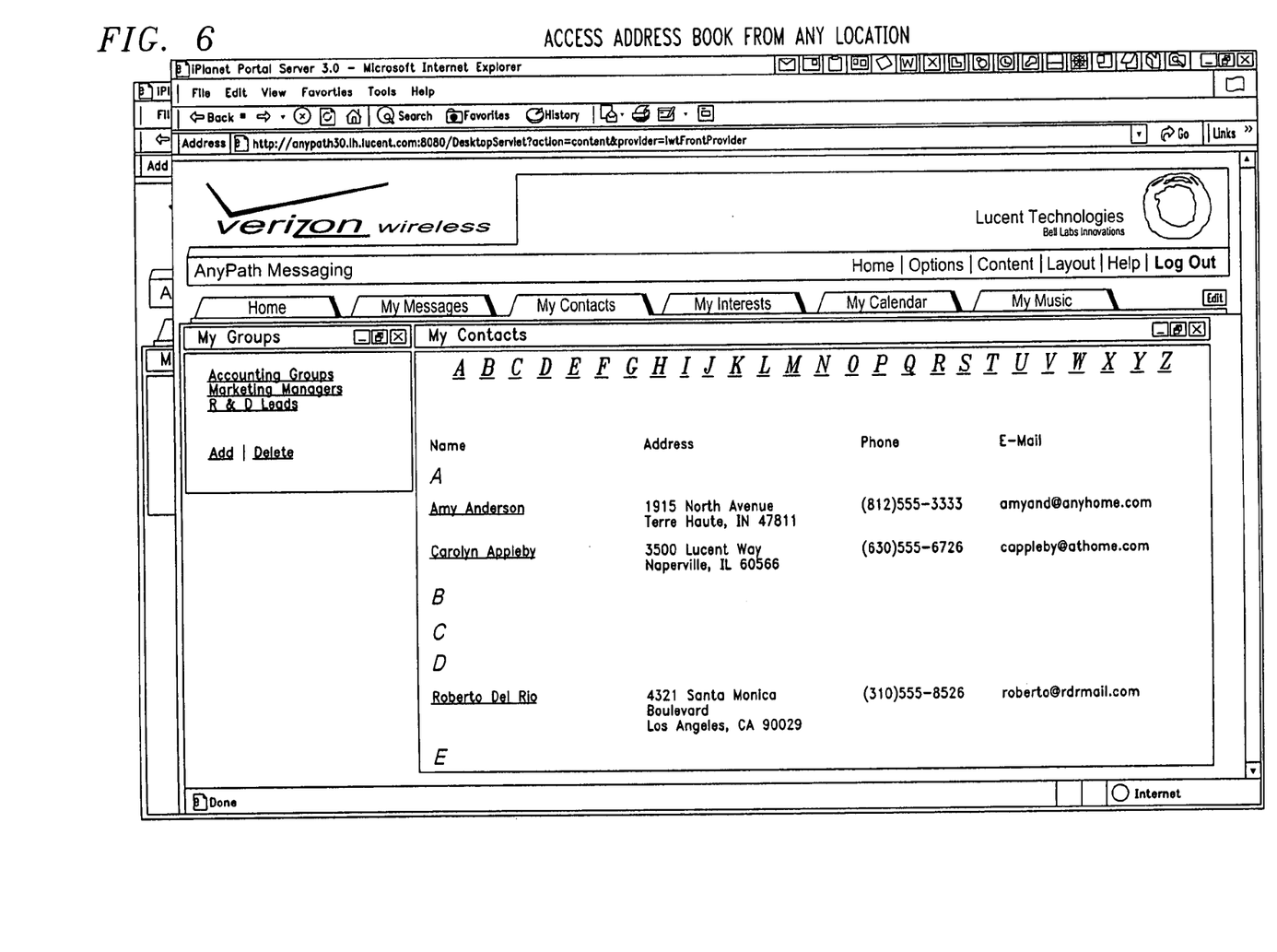

FIGS. 3A & 3B illustrate in flow diagram form the operation of the present single sign-on system and FIGS. 4-6 illustrate typical user interface displays that are presented to a subscriber by the present single sign-on system in the execution of various subscriber-selected functions.

In operation, the subscriber at step 301 initiates a communication link from a communication device, such as wireless phone 111, to a local serving communication system, such as WAP gateway 145 to initiate communication with the single sign-on system 100. At step 302, the serving communication system 145 extends the communications link from the subscriber's communication device 111 to the single sign-on system 100 via the Internet 110. The subscriber, once logged in to the Internet 110 using their Browser, uses the URL of the AnyPath Web site 142 at step 303 to retrieve the AnyPath web page. The AnyPath web server web page prompts subscriber to enter their mobile telephone number and password at step 304 into the designated data fields in the AnyPath web server web page.

The AnyPath system 102 validates the subscriber's telephone number and password in the subscriber profile database on the AnyPath Administration and Control Server directory server at step 305. The master directory 105 located in the single sign-on system 100 authenticates the subscriber and then allows the subscriber to access the messaging services that are enabled in their profile and that are accessible via the integrated service systems noted above via a typical display such as that shown in FIG. 4. The master directory 105 contains subscriber profile data, such as mobile telephone number, spoken name, e-mail address, services access, and links to the personal address book and calendar servers that serve the subscriber, to enable the subscriber access their services. The subscribers can move seamlessly among the allowed messaging services to share messaging applications.

Upon successful logon, the AnyPath web server presents the subscriber with the AnyPath Messaging home page at step 306. The AnyPath Messaging home page has several tabs that the subscriber can click on to perform specific functions such as voicemail, fax and email message retrieval, personal options, personal address book and calendar. There are two main components to enabling unified access to user data—the service wide directory and user interface. AnyPath provides a centralized service wide directory 105 that includes the Personal Address Book and Calendar sub-directories. The personal address book contains the user contact list data which includes contact name, address, telephone number, mobile phone number, and email address. The calendar data includes the date, time, location, and notification of specific events. The user interface enables the ability for the subscriber to access and update the various databases. The user can access and update the personal address book and calendar directories from the AnyPath Web User Interface. The subscriber is able enter calendar event information or modify contact list data from a web screen.

As an example, the subscriber decides to click on the tab for personal address book at step 307. The AnyPath web server displays at step 308 the subscriber's personal address book page with a list of subscriber options as shown in FIG. 6. The subscriber can select to add a new contact, delete a contact, or change an existing contact. The subscriber can add or delete or modify a personal distribution list for sending voice/email messages as well. The subscriber selects one of these options at step 309 and then the AnyPath web server displays the appropriate web page at step 310.

The subscriber enters the data at step 311 and then the web server at step 312 passes the data to the AnyPath Administration and Control Server 123, 124 to add or delete or change the subscriber's personal address book directory 105.

AnyPath also supports the ability for a user to import a data file from their Personal Computer 114 into the AnyPath Personal Address Book and Calendar sub-directories of the service wide directory 105. Both the personal address book and calendar sub-directories also support importing data from PDA devices 112 and Microsoft Outlook software using comma separated value test format files. The subscriber clicks on a web screen button to select the file to be imported into the AnyPath service wide directory. AnyPath would accept the file and then import the data into the directory using LDAP standard protocol. The user is also able to update their personal address book through the AnyPath Voice Activated Dialing application 131. The subscriber would dial a 10-digit number or short code (i.e. *86) from their handset to access AnyPath and be placed into the Voice Activated Dialing service. At this point, the user can speak a pre-defined phrase such as "Go to Contact List". AnyPath would recognize the command and enable the user to add, delete, and change a contact list using speech commands. AnyPath would collect the voice imprint data and store it in the personal address book directory. The subscriber then receives a message from AnyPath stating that the action was successful. The subscriber can continue to update the personal address book or they may choose to return to the main menu and select another option.

The subscriber now selects the tab with calendar at step 313. The AnyPath web server displays the calendar web page as shown in FIG. 5 to the subscriber at step 314. The subscriber is able to enter, delete, or modify calendar events on screen at step 315. They can also click on a specific date and enter an appointment into their calendar. The calendar screen is used to manage specific date/time events. The subscriber is also able to import/export data to their PDA devices 112 from the calendar screen by selecting on the appropriate button. The AnyPath web server queries and updates the AnyPath Administration and Control Server calendar directory. The subscriber then chooses to log off the web page by exiting at step 316.

SUMMARY

The present single sign-on system provides a wireless subscriber with the ability to login with a single service provider and then move seamlessly among the allowed messaging services to share personal address book and calendaring applications.

What is claimed:

1. A unified messaging system that serves to interconnect a subscriber with a plurality of independently operable messaging services to which they subscribe, each of said messaging services having a separate login and password for said subscriber, said unified messaging system comprising:

sign-on service means, accessible to a subscriber via a communication medium, for providing said subscriber with a single point of access for a plurality of independently operable messaging services that are accessible to said sign-on service means via said communication medium, comprising:

service-wide directory means for storing said separate login and password data for said subscriber for each of said messaging services, user interface means for providing said subscriber with a single user interface to access all of said messaging services, and user login means for providing said subscriber with a single login to access said single user interface; and unified service access means, responsive to said subscriber selecting at least one of said messaging services, for using said subscriber login and password data to automatically log in to each of said messaging services selected by said subscriber via said user interface to access messages stored therein and share personal address book and calendaring applications among said selected messaging services via said communication medium.

2. The unified messaging system of claim 1 further comprising:

means, responsive to said subscriber signing on to the sign-on service means, for accessing subscriber's account profile information located in said sign-on service means in a centralized profile for messaging services.

3. The unified messaging system of claim 1 further comprising:

directory means for authenticating said subscriber; and means for allowing the subscriber to access one of said plurality of independently operable messaging services that are enabled in their account profile.

4. The unified messaging system of claim 3 further comprising:

wherein said directory means contains subscriber profile data including at least one of: mobile telephone number, spoken name, e-mail address, services access, and links to the personal address book and calendar servers.

5. The unified messaging system of claim 1 further comprising:

means for enabling said subscriber to move seamlessly among the allowed messaging services to share personal address book and calendaring applications.

6. The unified messaging system of claim 1 further comprising:

means to enable said subscriber to access said sign-on service means via a one of a Telephone User Interface and a WEB User interface using a laptop or personal computer.

7. A method of providing a unified messaging service that serves to interconnect a subscriber with a plurality of independently operable messaging services to which they subscribe, each of said messaging services having a separate login and password for said subscriber, said unified messaging system comprising:

providing said subscriber with a single point of access, via a sign-on service interface, accessible to a subscriber via a communication medium for a plurality of independently operable messaging services that are accessible to said sign-on service means via said communication medium, comprising:

storing said separate login and password data for said subscriber for each of said messaging services, providing said subscriber with a single user interface to access all of said messaging services, and providing said subscriber with a single login to access said single user interface; and using, in response to said subscriber selecting at least one of said messaging services, said subscriber login and password data to automatically log in to each of said messaging services selected by said subscriber via said user interface to access messages stored therein and share personal address book and calendaring applications among said selected messaging services via said communication medium.

8. The method of providing a unified messaging service of claim 7 further comprising:

accessing, in response to said subscriber signing on to the sign-on service interface, said subscriber's account profile information located in said sign-on service interface in a centralized profile for messaging services.

9. The method of providing a unified messaging service of claim 7 further comprising:

authenticating said subscriber using a directory of subscribers; and allowing the subscriber to access one of said plurality of independently operable messaging services that are enabled in their account profile.

10. The method of providing a unified messaging service of claim 9 further comprising:

storing subscriber profile data in said directory including as least one of: mobile telephone number, spoken name, e-mail address, services access, and links to the personal address book and calendar servers.

11. The method of providing a unified messaging service of claim 7 further comprising:

enabling said subscriber to move seamlessly among the allowed messaging services to share personal address book and calendaring applications.

12. The method of providing a unified messaging service of claim 7 further comprising:

enabling said subscriber to access said sign-on service interface via a one of a Telephone User Interface and a WEB User interface using a laptop or personal computer.

* * * * *